United States Patent Office 2,867,672
Patented Jan. 6, 1959

2,867,672

METHOD OF MINIMIZING STYRENE POLYMERIZATION DURING STORAGE

Rolf H. Hemmerich, Larchmont, N. Y., assignor to Shell Development Company, New York, N. Y., a corporation of Delaware No Drawing. Application August 29, 1955
Serial No. 531,262

1 Claim. (Cl. 260—666.5)

This invention is concerned with minimizing the polymerization of styrene monomer. More particularly, it is directed to a process for preventing the formation of polystyrene during storage of the monomer.

Styrene monomer is normally stored in tanks or other enclosed containers as a liquid. It is highly desirable to maintain the styrene in monomeric condition so that polymerization may be conducted under optimum conditions in order to obtain a desired type of polymer. In furthering this end, the monomeric material is normally inhibited with substances such as those enumerated hereinafter and stored in tanks which are either refrigerated, insulated or both. In spite of all these precautions, a certain amount of polymerization occurs. It has been found that this is principally due to vaporization of styrene from the main body of the liquid monomer into the vapor space and subsequent condensation of uninhibited monomer upon the enclosing surfaces of the tank. Since the polymerization inhibitors utilized are relatively non-volatile at the temperatures of storage (50–100° F.), the vaporized styrene containing essentially no inhibitor polymerizes readily on the surfaces exposed to the vapor and thereafter slips back into the main body of the liquid styrene, thus contaminating it with undesirable amounts of polymer.

It is an object of the present invention to minimize the polymerization of monomeric styrene during storage. It is another object of the present invention to minimize uninhibited films of condensed styrene vapors. It is a further object of this invention to depress polymerization of styrene in the vapor state. Further objects of the invention comprise a maintenance of a more uniform temperature on the exposed surfaces of the tank and the possibility of eliminating or diminishing the requirement for tank refrigeration and/or insulation under most storage conditions encountered. Other objects will become apparent from the following disclosure.

Now, in accordance with the present invention, it has been found that the polymerization of uninhibited styrene condensing in liquid form on the surfaces containing the vapor space above the liquid level of the main body of styrene in a tank (or other receptacle) may be minimized by spraying the surfaces enclosing the vapor space with a styrene polymerization inhibitor. More particularly, the invention in its preferred form comprises spraying the tank surfaces which enclose the vapor space with a styrene solution of a styrene polymerization inhibitor. Still more particularly, the preferred version of the present invention comprises spraying the interior surface confining the vapor space of a styrene storage tank with a sufficient amount of a styrene solution of a polymerization inhibitor so as to maintain on said surfaces a styrene solution having at least the minimum protective amount of a styrene polymerization inhibitor, usually at least about one part per million by weight.

A further preferred aspect of the present invention comprises utilizing a portion of the main body of inhibited styrene solution contained in the tank for the purpose of spraying the interior surfaces exposed to the vapor space whereby the uninhibited styrene condensing on those surfaces is relatively continuously washed back into the main liquid body of inhibited styrene. A further aspect of this process comprises utilizing a portion of the styrene solution being circulated for the addition of "booster" amounts of inhibitor for the purpose of spraying the confining surfaces exposed to the vapor space. Since under many conditions and with numerous inhibitors, the latter are consumed during the storage period, it is often necessary to add further quantities of inhibitors to the stored liquid styrene monomer in order to maintain a minimum inhibitor concentration so as to depress undesired polymerization to a maximum degree.

Any desired means for spraying the exposed interior surface of the tank may be utilized. These means are well known in the mechanical art. They may comprise a coarse spray or a more finely divided fog, the latter being especially suitable for minimizing the polymerization of styrene in the vapor space even before it has condensed in liquid form on the confining interior surface of the tank. It is preferred that the temperature of storage, that is, the temperature of the main body of stored liquid styrene monomer, be no higher than 100° F. and preferably between about 70 and 95° F. Under these conditions and when containing a minimum of about one part per million by weight of at least one styrene polymerization inhibitor, mentioned below, the product may be maintained in the monomeric state over extended periods of storage time. Since the step of spraying as described may result in a build-up of electrostatic charges, it is preferred that the tank be adequately grounded and/or the main body be blanketed with an inert gas such as nitrogen.

In carrying out the present invention, the exact identity of the styrene polymerization inhibitor is not critical. Any of the materials known for this purpose may be utilized. Suitable materials include especially the following:

(1) Amines and nitrogen-containing inhibitors, particularly aryl amines such as:

α-Naphthylamine,
Thiodiaryl amines,
p-Phenylene diamine,
o-Phenylene diamine,
2,4-diamino diphenylamine,
Phenylhydrazine,
Benzamide,
Cyclohexyl naphthyl amine,
Polybutyl amines, and
Methyl aniline.

Particularly desirable results may be obtained by the use of secondary aryl amines having the following general formula:

in which $R_1$ is a substituted or an unsubstituted aryl such as phenyl or naphthyl; aralkyl such as tolyl or methyl phenyl; cycloparaffinic such as cyclobutyl, cyclopentyl, or cyclohexyl; cycloolefinic such as cyclobutenyl, cyclopentenyl, or cyclohexenyl; hydroaromatic such as dihydrophenyl, or tetrahydrophenyl; or naphthenic such as methyl cyclohexyl, ring or group; and in which R is a substituted or an unsubstituted alkyl, such as, methyl, ethyl, propyl, butyl or amyl, aryl, aralkyl, cycloparaffinic, cycloolefinic, hydroaromatic, or naphthenic ring or group such as given in the case of $R_1$. Included are secondary amines such as for example:

and

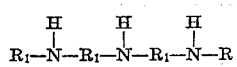

in which R and R₁ have the same meaning as before.

Secondary amines containing one or more aryl or substituted aryl groups are preferred such as:

Diphenyl-p-phenylene diamine,
Phenyl-β-naphthylamine,
Isopropoxydiphenyl amine,
Aldol-α-naphthyl amine (and polymers thereof),
Symmetrical di-β-naphthyl-p-phenylenediamine,
Trimethyl dihydroquinoline (and polymers thereof),
Ditolylamines (and mixtures thereof),
Phenyl-α-naphthylamine, and
Phenyl-β-naphthylamine.

(2) Phenolic compounds, such as:

p-Tertiary butyl catechol,
Dihydroxybenzenes (and substitution products thereof),
Pyrogallol (and substitution products thereof),
Pyrocatechol,
Resorcinol,
Xylenols,
Catechol,
Trihydroxybenzene (and substituents thereof),
Nitrosophenol,
Diaminophenol,
α-Naphthol,
Dihydroxynaphthalene,
Hydroxy quinoline,
Hydroxy tetrahydroquinoline,
Polyhydric phenols,
Polyhydroxy phenanthrene, and
4-nitroso-2-methyl phenol.

(3) Compound inhibitors, such as:

Acyl-substituted amino phenols,
4-cyclohexyl amino phenol,
p-Amino phenol,
o-Amino phenol and
5-amino-2-hydroxytoluene.

(4) Miscellaneous inhibitors, such as:

Hydroquinone,
Quinol,
Nitrosonaphthols,
Quinhydrone,
Reaction product of an aldehyde and an amine,
p-Amino acetophenone,
Dihydroxy anthraquinone,
Reaction product of a ketone with an amine,
p-Nitroso dimethyl aniline,
Benzoquinone,
1-aminoanthraquinone, and
Toluquinone.

Excellent results may be obtained when one or more inhibitors selected from a list comprising (1) secondary aryl amines such as phenyl-β-naphthylamine, diphenyl-p-phenylene diamine, isopropoxy-diphenylamine, aldol-α-naphthylamine (and polymers thereof), symmetrical di-β-naphthyl-p-phenylene diamine, trimethyl dihydroquinoline (and polymers thereof), and the ditolylamines; (2) phenolic compounds, such as p-tertiary butyl catechol and alkylated polyhydroxy phenols; and (3) reaction products of a ketone (such as acetone) and/or an aldehyde (such as formaldehyde and acetaldehyde) with an amine (such as aniline) are employed in the refining process described.

While it is preferred that the proportion of polymerization inhibitor be maintained at a minimum level consistent with maintenance of the styrene in monomeric condition over the storage period, the inhibitor concentration may be any from between about one part per million (preferably at least five p. p. m.) up to about 2% by weight, although a preferred concentration range is between about 5 and about 30 parts per million. Preferred inhibitors especially contemplated are the alkylated (1–3 alkyl radicals of 2–6 carbon atoms each) catechols of which para-tertiary butyl catechol is the most desirable member. An amount of the inhibited styrene solution is to be sprayed on the exposed interior container surfaces to maintain a polymerization inhibitor concentration of at least one part per million by weight based not only upon the styrene in which the inhibitor may be contained, but also when diluted with the liquid styrene resulting from condensation of styrene vapors upon the exposed surfaces. This is the interpretation to be placed upon the concentration limitations to be found in the claim.

The use of the present invention results in the maintenance of high monomer purity in storage, which is essential with respect to product sales specifications for polymer grade styrene. It obviates the necessity for re-running off-specification products or for using products contaminated with polymer or polymerization to products of lower grade. Due to the fact that the spraying operations tend to provide a film temperature at the interior surface of the container at a value approaching that of the bulk storage temperature, the capital investment for refrigeration and insulation is minimized. It should of course be recognized that the spraying operation increases the heat transfer rate with respect to the external environment when temperature differences exist which accounts for the need of some insulation under certain conditions. Furthermore, the time which the monomer can be stored without an undesirable degree of polymerization occurring is extended.

The following examples illustrate the process of the present invention:

*Example I*

Liquid styrene monomer containing about 15 parts per million of para-tertiary butyl catechol is stored in a 25,000 barrel tank at a temperature of about 75° F. The tank, when maintained at a level approximately three-quarters full, has a vapor space above the liquid level comprising the tank roof and the upper approximate one-quarter of the tank sides area. In this vapor space, monomeric styrene vaporizes and condenses in substantially uninhibited state upon the exposed tank surfaces. At least a portion of this uninhibited styrene polymerizes and slips back into the main body of the liquid monomer, thus raising the polymer content to an undesirably high level as the storage period is extended. When this same tank is modified by the installation of a spray suitable for circulating part of the inhibited main body of the liquid over the entire surface exposed to the vapor space, it is found that substantially no polymerization occurs on the exposed surfaces thus protected. Furthermore, it can be determined under most conditions insulation and refrigeration are unnecessary under this system in order to maintain the tank at the desired temperature between about 70 and 95° F. so as to minimize polymerization due to the thermal level. In certain locations where prolonged periods of high atmospheric temperature are encountered it may be necessary to install a cooler in the circulating circuit to prevent an excessive temperature rise, particularly when the tank is at low level. The prevention of polymerization is found to occur when the combined liquid styrene (i. e. that resulting from spraying and also from condensation of styrene vapor) upon the exposed interior tank surfaces contains a minimum of about 5 parts per million of paratertiary butyl catechol.

*Example II*

The spraying process can be carried out by utilizing the same type of tank as described in Example I, but substituting for the side stream from the main body of liquid styrene a separate source of styrene monomer containing between about 50 and 250 parts per million of phenyl-α-naphthylamine, the amount of sprayed solution being sufficient to produce a liquid film of styrene on the exposed surfaces of the tank, such that the combined film of sprayed solution and condensed vapors contains between about 10 and about 25 parts per million of the inhibitor. Under these conditions, it is found that substantially no polymerization occurs on the exposed surfaces and, due to the concentrated solution used for the spraying of said surfaces, the amount of spraying is reduced substantially from that necessary in the process described in Example I.

I claim as my invention:

In a process for minimizing polymerization of styrene, wherein a liquid body of styrene containing a polymerization inhibitor is contained at about atmospheric temperature and pressure in a storage vessel having an enclosed vapor space above the surface of the body of liquid, styrene vaporizes in the vapor space while substantially none of the inhibitor vaporizes therewith, the vaporized styrene condenses on the surfaces enclosing the vapor space, and at least a portion thereof polymerizes, the step comprising spraying the enclosing surfaces with a portion of the inhibited liquid body of styrene circulated from the lower portion of said storage vessel whereby polymerization of styrene vapors condensing on the enclosing surfaces is inhibited and the condensed styrene is washed into the main body of the liquid styrene.

References Cited in the file of this patent

UNITED STATES PATENTS

| | | |
|---|---|---|
| 2,042,274 | Pollock | May 26, 1936 |
| 2,171,795 | Kautter | Sept. 5, 1939 |
| 2,240,764 | Dreisbach et al. | May 6, 1941 |
| 2,410,408 | Durland | Nov. 5, 1946 |
| 2,413,255 | Soday | Dec. 24, 1946 |
| 2,473,203 | Howe | June 14, 1949 |